(12) United States Patent
Takagi et al.

(10) Patent No.: US 7,509,665 B2
(45) Date of Patent: Mar. 24, 2009

(54) DIGITAL TELEVISION BROADCAST SIGNAL RECEIVER

(75) Inventors: Toshihiro Takagi, Daito (JP); Masanori Kawai, Daito (JP); Naoki Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 672 days.

(21) Appl. No.: 11/116,382

(22) Filed: Apr. 28, 2005

(65) Prior Publication Data

US 2005/0246750 A1    Nov. 3, 2005

(30) Foreign Application Priority Data

Apr. 28, 2004    (JP)    ............................... 2004-132342

(51) Int. Cl.
*H04N 7/20*    (2006.01)
(52) U.S. Cl. .......................... 725/72; 725/151; 455/25; 455/63.4
(58) Field of Classification Search ................... 725/72, 725/151; 375/240–240.29; 348/570, 731–732; 455/25, 63.4
See application file for complete search history.

(56) References Cited

U.S. PATENT DOCUMENTS

2004/0248517 A1* 12/2004 Reichgott et al. .......... 455/63.4

FOREIGN PATENT DOCUMENTS

| EP | 1 267 443 | 12/2002 |
| JP | 57-212880 A | 12/1982 |
| JP | 05-232205 | 9/1993 |
| JP | 10-322614 A | 12/1998 |
| JP | 2003-60423 | 2/2003 |
| JP | 2003-92544 A | 3/2003 |

OTHER PUBLICATIONS

Lourens, J.G.; de Waal, W.R.M. "On the TV ghost image mode" Communications and Signal Processing, 1994. COMSIG-94., Proceedings of the 1994 IEEE South African Symposium on Oct. 4, 1994 pp. 168-170.*
Japanese Office Action dated Oct. 16, 2007 with English translation (Three (3) Pages).

* cited by examiner

*Primary Examiner*—Scott Beliveau
*Assistant Examiner*—Mark P Stanley
(74) *Attorney, Agent, or Firm*—Crowell & Moring LLP

(57) ABSTRACT

In a digital TV broadcast signal receiver connected to a multi-directional antenna called smart antenna and receivable not only digital TV broadcast signals but also analogue TV broadcast signals, an optimum signal receiving direction of an analogue TV broadcast signal of an optional channel can be decided with reducing affect of ghost due to reflection of the TV broadcast signal by such as a high-rise building, or the like. An NTSC decoder takes a still image data from an analogue TV broadcast signal in each signal receiving direction of the multi-directional antenna, and performs an A/D conversion processing and a JPEG compression processing to the image data. A controller decides a direction, in which a complexity, such as bit rate of the image data is the smallest, as an optimum signal receiving direction of the channel.

6 Claims, 5 Drawing Sheets

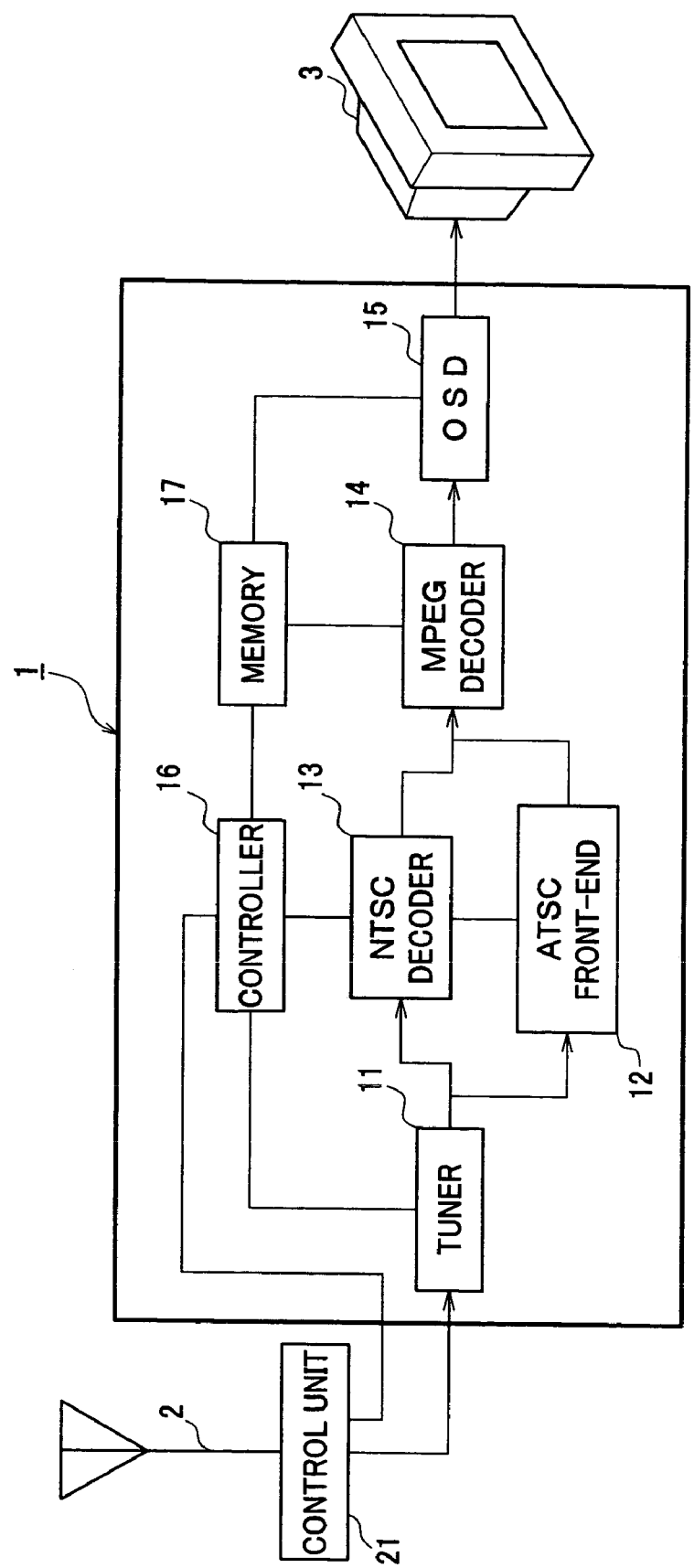

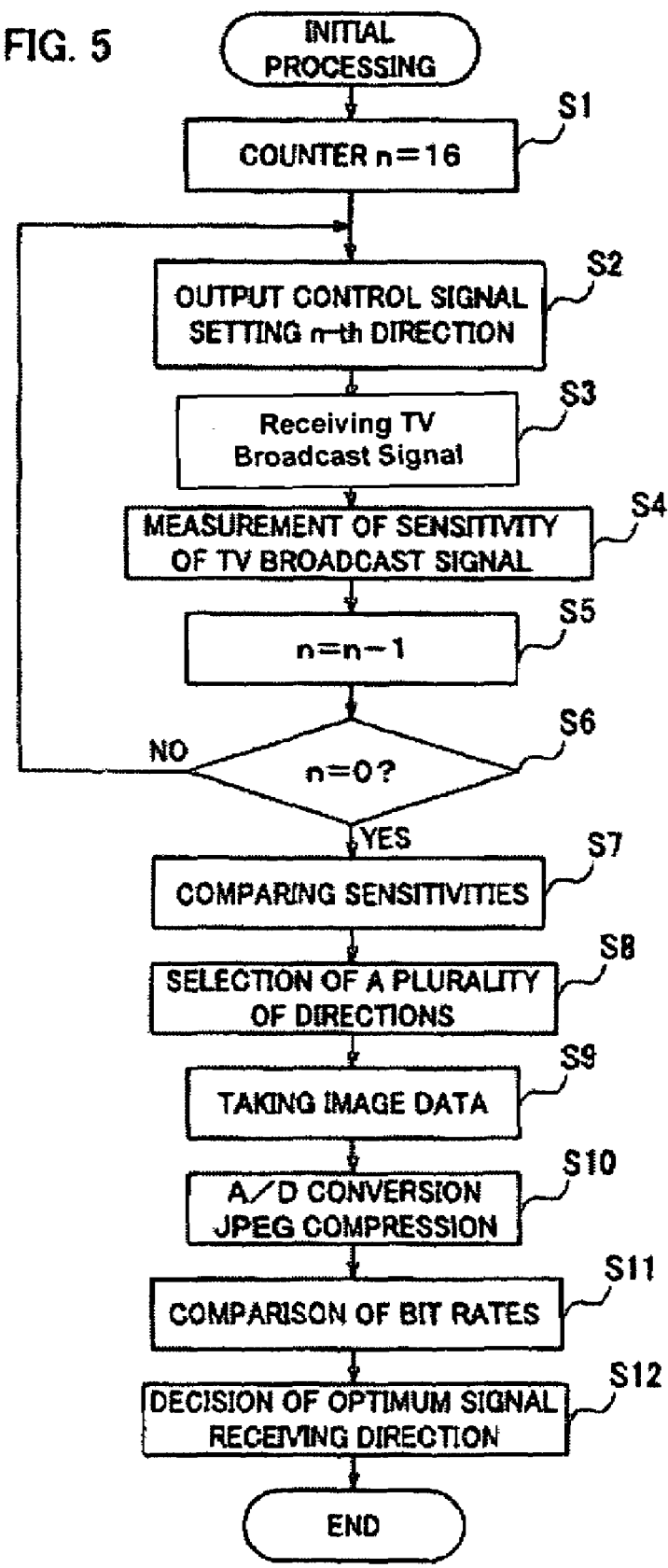

DIGITAL TELEVISION BROADCAST SIGNAL RECEIVER

BACKGROUND OF THE INVENTION

1. Field of the Invention

The present invention relates to a digital television (TV) broadcast signal receiver that can receive not only digital television broadcast signals such as ATSC (Advanced television systems Committee), but also analogue television broadcast signals such as NTSC National Television System Committee).

2. Description of the Related Art

In the North American Continent where an ATSC digital television broadcast (it is abbreviated to a hereinafter digital TV broadcast) is performed, plains are dotted with metropolises, so that various TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

With respect to an apparatus for controlling a signal receiving direction of an antenna, Publication of Japanese Patent Application No. 5-232205 shows an apparatus mounted on a moving body such as a vehicle for following a communication satellite. Publication of Japanese Patent Application No. 2003-60423 shows a smart antenna used for communicating between a mobile phone and a base station.

According to the EIA-909 technical standard, it is provided that a smart antenna has sixteen signal receiving directions in respective directions where a circle is divided into sixteen. A digital TV broadcast signal receiver in compliance with the EIA-909 technical standard can switch an effective signal receiving direction of the multi-directional antenna such as the smart antenna to one of all the sixteen signal receiving directions. In addition, the digital TV broadcast signal receiver can receive conventional NTSC analogue TV broadcast signals.

There are digital TV broadcast signal receivers having an automatic scanning function for selecting a signal receiving direction of the multi-directional antenna in which a TV broadcast signal of a channel chosen by a user can be received at the best condition. In general, an antenna of a TV station, that is, a position of a TV tower is invariance. Thus, a TV broadcast signal of each channel is searched in each sixteen signal receiving direction as an initial processing of the digital TV broadcast signal receiver, and a signal receiving direction, in which the signal receiving condition is the most suitable, is set as an optimum signal receiving direction of each channel. For example, in the United States, a TV station can be established relatively easier. In contrast, a TV station suddenly becomes bankrupt. Therefore, it happens that a new channel, which cannot be received beforetime, can be received, or an old channel receivable long before cannot be received. Furthermore, a signal receiving condition of a TV broadcast signal of a channel is varied due to construction of a high-rise building. Thus, it becomes necessary to reset an optimum signal receiving direction for receiving a TV broadcast signal of a channel chosen by a user.

In general, a direction showing the largest value of the sensitivity of the TV broadcast signal among the directions in which the TV broadcast signal can be received is defined as an optimum signal receiving direction with respect to each channel. However, when a megastructure such as the high-rise building exists in the vicinity of a multi-directional antenna, a reflected TV broadcast signal reflected by the megastructure is superimposed on a TV broadcast signal directly transmitted from a TV station of a predetermined channel in a signal receiving direction of the multi-directional antenna, so that it is possible that a sensitivity of the TV broadcast signal in the signal receiving direction becomes larger than a sensitivity of a TV broadcast signal directly transmitted from the TV station. In such a case, if the direction showing the largest value of the sensitivity of the TV broadcast signal is regarded as an optimum signal receiving direction of the channel, color signals and/or horizontal synchronized signal cannot be received normally due to ghost image, since the reflected TV broadcast signal is superimposed an the TV broadcast signals directly transmitted from the TV station. Consequently, the colors of the image cannot be reproduced on a monitor screen, or image displayed on the monitor screen rolls from side to side. By the way, when the TV broadcast signal is digital signal, the digital TV broadcast signal receiver has error correction function, so that it is possible to judge the optimum signal receiving direction while error correction process. Accordingly, the above-mentioned problem relates to analogue TV broadcast signals, essentially.

SUMMARY OF THE INVENTION

A purpose of the present invention is to provide a digital TV broadcast signal receiver which is connected to a multi-directional antenna and can receive analogue TV broadcast signals, in which an optimum signal receiving direction of an optional a channel can be decided with using an image displayed on a monitor screen in practice.

A digital TV broadcast signal receiver in accordance with an aspect of the present invention is connected to a multi-directional antenna having a plurality of signal receiving directions in compliance with a predetermined technical standard, and receives a digital TV broadcast signal or an analogue TV broadcast signal by making only one signal receiving direction among a plurality of the signal receiving directions effective.

The digital TV broadcast signal receiver comprises a tuner for receiving a TV broadcast signal through the multi-directional antenna, and a controller for switching an effective signal receiving direction of the multi-directional antenna.

When a multi-directional antenna is connected to the tuner and a TV broadcast signal of an optional channel is analogous, the tuner receives a TV broadcast signal of the optional channel in each signal receiving direction of the multi-directional antenna, and the controller takes an image data from each TV broadcast signal in each signal receiving direction, performs a predetermined process to each image data, and decides a signal receiving direction showing a lowest complexity of the image data as an optimum signal receiving direction of the optional channel.

By such a configuration, even when a megastructure such as a high-rise building exists in the vicinity of the multi-directional antenna, it is possible to reduce the affection of ghost or noise due to reflected TV broadcast signal by the megastructure. Specifically, since the data used for judging the optimum signal receiving direction of the optimum channel is taken from the TV broadcast signals, if reflected TV broadcast signal by the megastructure is superimposed on a TV broadcast signal directly transmitted from a TV station, a complexity of the TV broadcast signal in the signal receiving direction becomes higher due to ghost or noise. It is possible to distinguish a signal receiving direction in which the sensitivity of the TV broadcast signal is higher with no affection due to ghost or noise from another signal receiving direction in which the sensitivity of the TV broadcast signal is higher with affection due to ghost or noise of superimposed reflected TV broadcast signal by the megastructure.

It is possible that the controller takes a still image data from the TV broadcast signal which is essentially a moving picture, and performs an A/D conversion and JPEG compression to the still image data, compares bit rate of JPEG compressed data, and decides a signal receiving direction, in which a value of the bit rate is smallest, as the optimum signal receiving direction of the optional channel.

Furthermore, it is possible that the controller can perform an automatic scanning operation for switching the effective signal receiving direction of the multi-directional antenna to a signal receiving direction, in which the complexity of the image data of the processed television broadcast signal is the lowest.

BRIEF DESCRIPTION OF THE DRAWINGS

FIG. 4 is a block diagram showing a configuration of a digital TV broadcast signal receiver in accordance with an embodiment of the present invention;

FIG. 5 is a flowchart showing a process for deciding an optimum signal receiving direction of an optional channel in the digital TV broadcast signal receiver.

DETAILED DESCRIPTION OF THE EMBODIMENT

Figure 1:
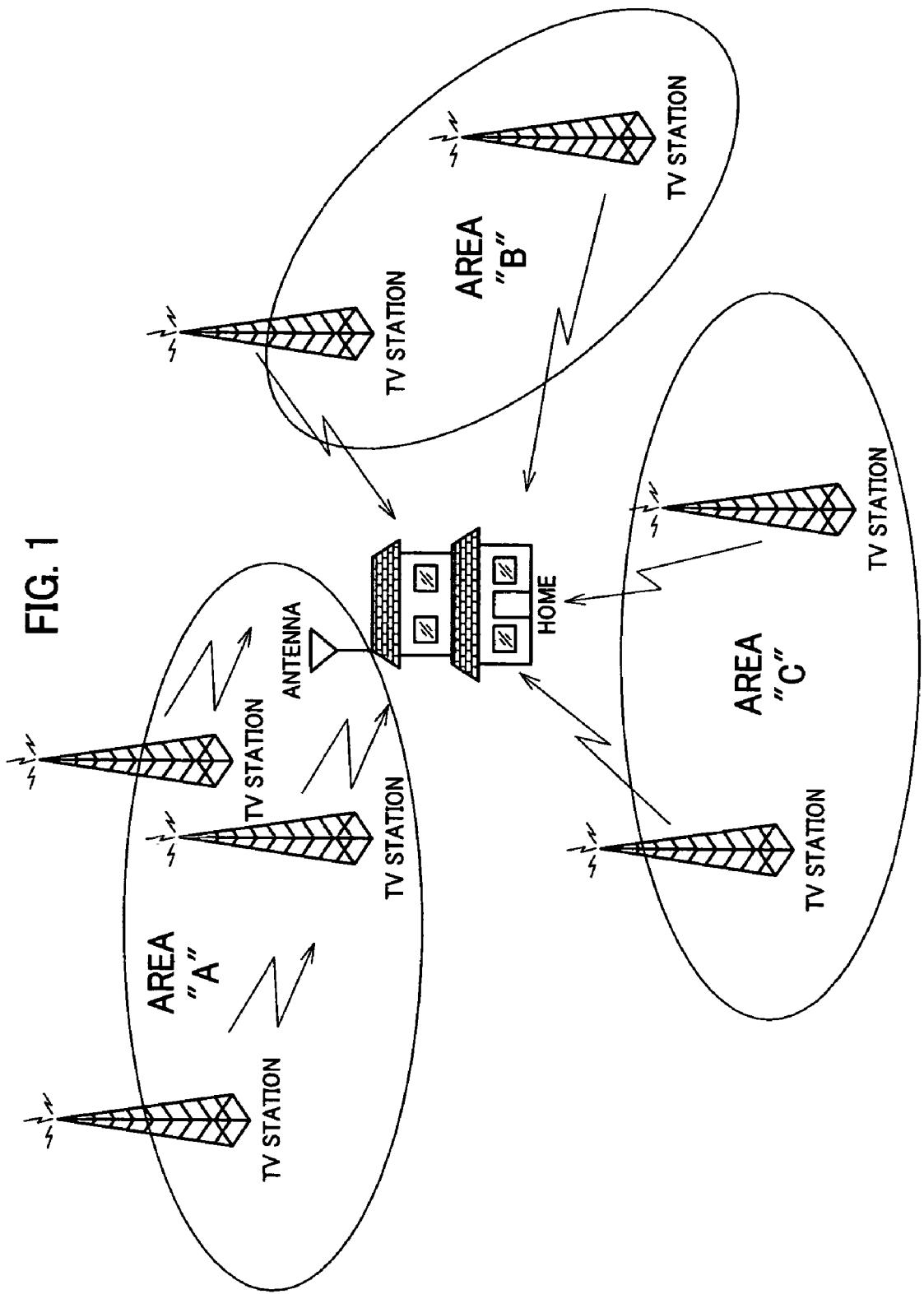
FIG. 1 is a conceptual diagram showing a circumstance for receiving digital television (TV) broadcast signals in home.

A digital TV broadcast signal receiver in accordance with an embodiment of the present invention is described with reference to figures. A circumstance for receiving TV broadcast signals in home is shown in FIG. 1. In an area where grand-based digital TV broadcast is performed, when a sensitivity of received signal of a TV broadcast signal is equal to or larger than a predetermined threshold value, an image having a predetermined image quality can be obtained by correction. Thus, it is possible to view TV programs by receiving TV broadcast signals which are delivered from TV stations existing at many positions in such as areas designated by symbols A, B, C, and so on, as shown in FIG. 1. According to such a circumstance, various types of multi-directional antennas called smart antenna having a plurality of signal receiving directions are put into practical use.

As a configuration of the multi-directional antenna, there are many types, for example, for rotating an antenna with a motor for changing the signal receiving direction, or having a plurality of signal receiving directions and electronic switches and selecting an effective signal receiving direction by switching on and off of the electronic switches. In addition, according to the EIA-909 technical standard, it is defined that a number of the signal receiving directions of the multi-directional antenna is defined as sixteen. It, however, is provided that a multi-directional antenna having four or eight signal receiving directions, in consideration of user's needs, price, and so on. In contrast, a digital TV broadcast signal receiver in compliance with the EIA-909 technical standard must be able to switch all of sixteen signal receiving directions with no relation to kind or number of signal receiving directions of the multi-directional antenna connected thereto.

Figure 2:
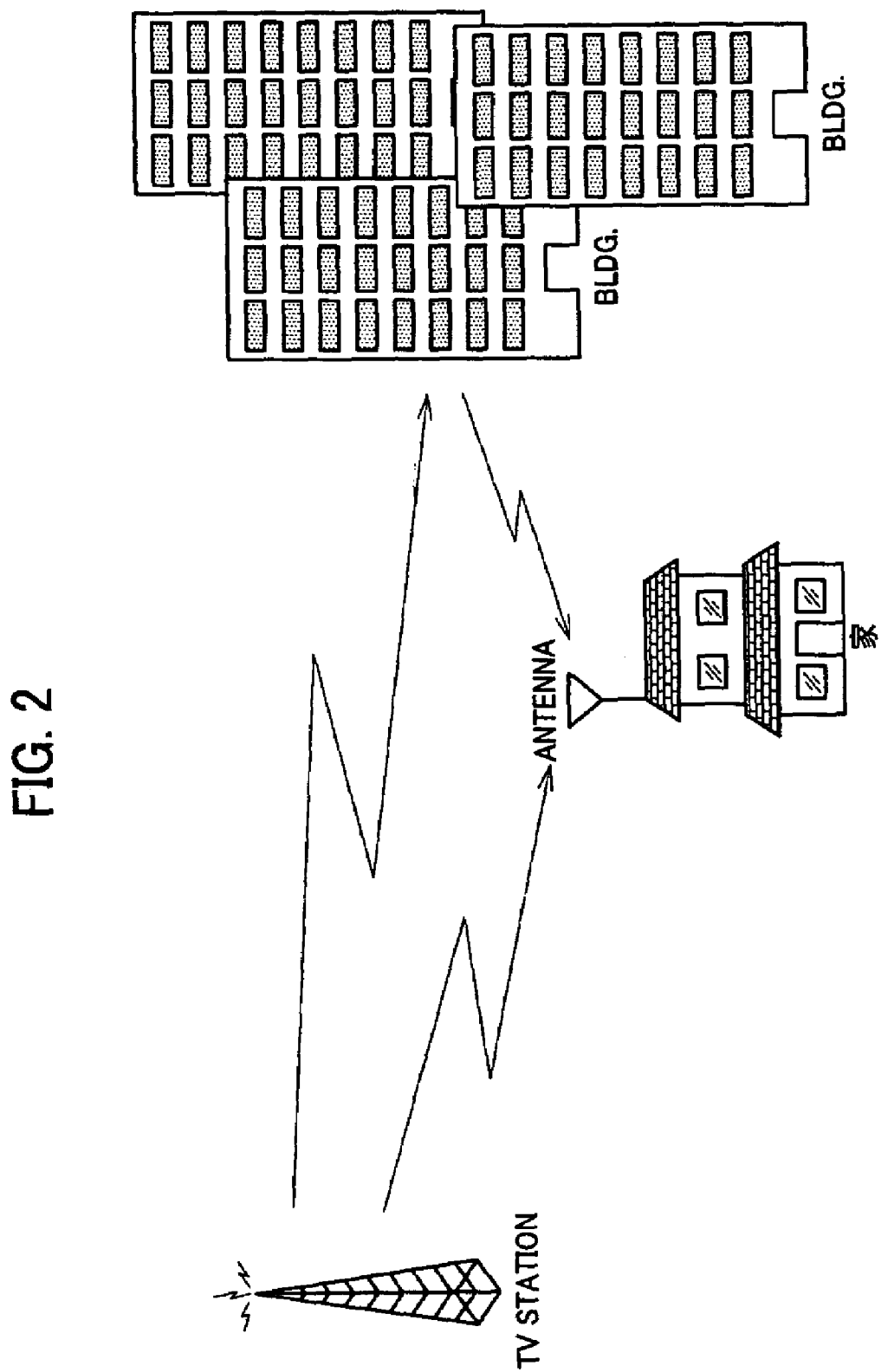
FIG. 2 is a conceptual diagram showing a condition that a reflection TV broadcast signal reflected by a megastructure such as a high-rise building superimposed on a TV broadcast signal directly transmitted from a TV station.
Figure 3:
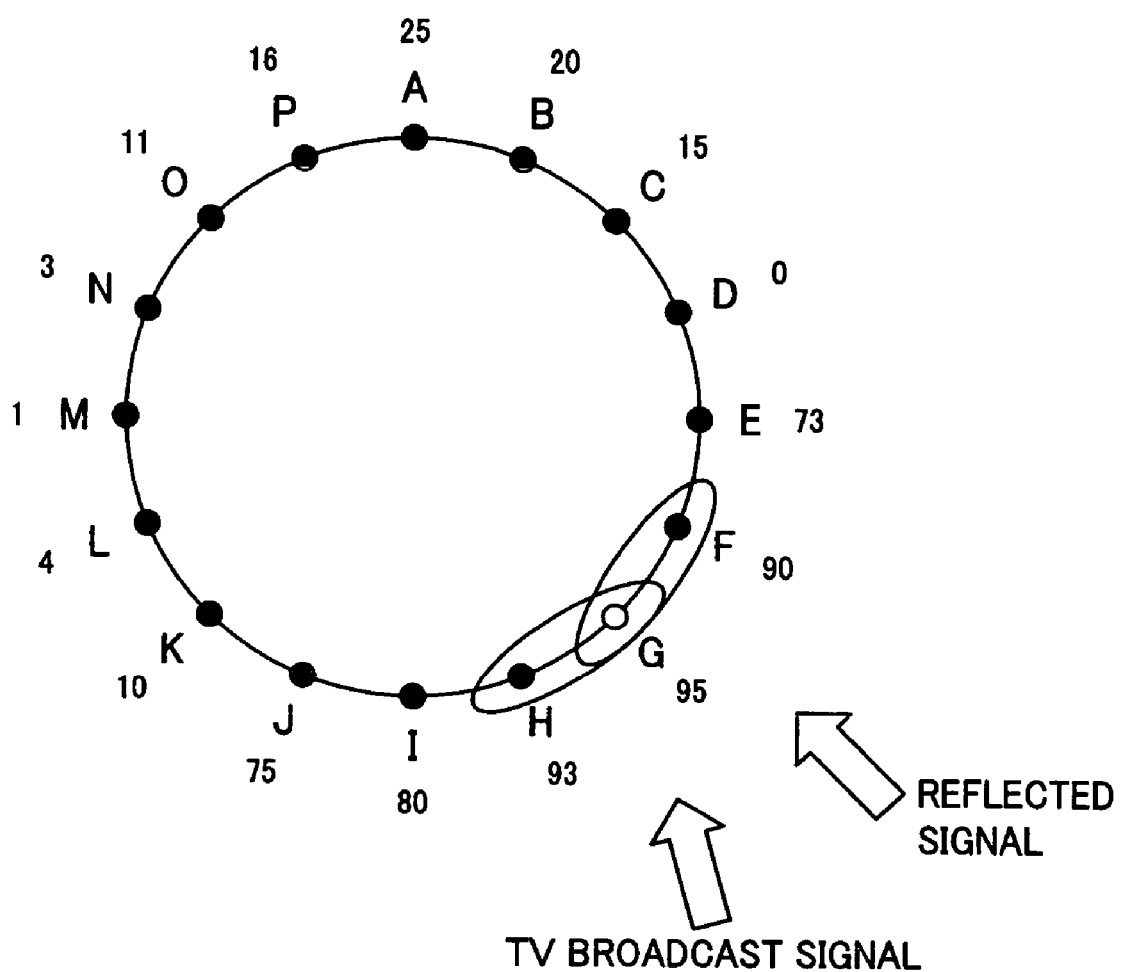
FIG. 3 is a diagram showing an example of a signal receiving condition of TV broadcast signals of an optional channel in each signal receiving directions of a multi-directional antenna.

In the digital TV broadcast signal receiver, when an effective signal receiving direction of a multi-directional antenna is switched, a signal receiving direction showing the largest value of the sensitivity of a TV broadcast signal with respect to receivable each channel is generally decided as an optimum signal receiving direction of the channel. However, when a multi-directional antenna is disposed in the vicinity of a megastructure such as a high rise building as shown in FIG. 2, a reflected TV broadcast signal reflected by the megastructure is superimposed on a TV broadcast signal directly transmitted from a TV station of a predetermined channel in a signal receiving direction of the multi-directional antenna, so that it is possible that a sensitivity of the TV broadcast signal in the signal receiving direction becomes larger than a sensitivity of a TV broadcast signal directly transmitted from the TV station in another signal receiving direction which is to be an optimum signal receiving direction of the channel if there is no reflected TV broadcast signal. FIG. 3 shows an example of a signal receiving condition of a TV broadcast signal in each signal receiving direction of the multi-directional antenna. In FIG. 3, symbols "A" to "P" respectively show the sixteen signal receiving directions defined in the EIA-909 technical standard, and numerals respectively show sensitivities of TV broadcast signals of an optional channel.

In a signal receiving direction designated by a symbol "G" (hereinafter, it is abbreviated as the signal receiving direction "G", and so fourth) in FIG. 3, in which a value of the sensitivity of the TV broadcast signal is the largest, the reflected TV broadcast signal reflected by the megastructure is superimposed on the TV broadcast signal directly transmitted from the TV station, so that a value of the sensitivity of the TV broadcast signal in the signal receiving direction "G" becomes larger than a vale of the sensitivity of the TV broadcast signal in a signal receiving direction "H", which is the optimum signal receiving direction of the channel, under normal circumference. Under such a signal receiving condition, if a direction showing the largest value of the sensitivity of the TV broadcast signal is defined as an optimum signal receiving direction of the channel, the effective signal receiving direction of the multi-directional antenna 2 will be set to the signal receiving direction "G". The user is forcibly viewed an image rolling from side to side with ghost superimposed thereon.

The digital TV broadcast signal receiver in accordance with this embodiment can receive not only the digital TV broadcast signals but also conventional analogue TV broadcast signals. When the digital TV broadcast signal receiver receives an analogue TV broadcast signal, an optimum signal receiving direction of each channel is decided with using an image actually displayed on a monitor screen, instead of a value of sensitivity of a TV broadcast signal in each signal receiving direction, so that an affect of reflected TV broadcast signal reflected by a megastructure such as a high-rise building. Since the error component of the digital TV broadcast signal can be corrected, it is possible to judge the optimum signal receiving direction while error correction process. Accordingly, the following description relates to the analogue TV broadcast signals, essentially.

A configuration of the digital TV broadcast signal receiver 1 in accordance with this embodiment is shown in FIG. 4. The digital TV broadcast signal receiver 1 comprises a tuner 11 serving as a TV broadcast signal receiving means which is connected to a multi-directional antenna 2, an ATSC frontend 12 serving as a digital signal processing means for processing predetermined signal processing to digital TV broadcast signals received by the tuner 11, and decoding the processed signals, an NTSC decoder 13 serving an analogue signal processing means for decoding analogue TV broadcast signals received by the tuner 11, an MPEG decoder 14 serving as signal output means for decoding MPEG compressed TV broadcast signals, an on screen display unit (OSD) 15 for superimposing a predetermined display image onto the decoded TV broadcast signals, a controller (CPU) 16 serving as entire control means for sensing signal receiving condition of the TV broadcast signals received by the tuner 11, for controlling a control unit 21 of the multi-directional antenna 2 (serving as a signal receiving direction deciding means and a control signal output means), and for controlling the ATSC front-end 12, the NTSC decoder 13, and so on, and a memory 17 serving an memory means for temporarily memorizing the decoded TV broadcast signals and for memorizing the display image to be superimposed on the decoded TV broadcast signals. The decoded TV broadcast signals decoded by the MPEG decoder 14 is outputted to a monitor display apparatus 3 through the on screen display unit 15, so that the image is displayed on the screen of the monitor display apparatus 3.

In the digital TV broadcast, data can be transmitted from the digital TV broadcast signal receiver 1 at user side to the TV station. It, however, is nothing to the present invention directly, so that the description of it is omitted.

The control unit 21 of the multi-directional antenna 2 makes only one signal receiving direction among a plurality of the signal receiving directions, which is chosen by the controller 16, effective, corresponding to the control signal outputted from the controller 16. When the multi-directional antenna 2 rotates an antenna with a motor in order to change the signal receiving direction, the control unit 21 controls the motor to orientating the antenna corresponding to the direction selected by the controller 16. Alternatively, when the multi-directional antenna 2 switches on and off of electronic switches in order to switch the effective signal receiving direction, the control unit 21 switches on only one electronic switch corresponding to the direction selected by the controller 16 and off the other electronic switches.

The NTSC decoder 13 has an A/D converting function for converting a received analogue TV broadcast signal to a digital signal, once, and a JPEG compression function, which will be described later. When the monitor display apparatus 3 has an analogue input terminal, it is generally sufficient that an analogue signal decoded by the NTSC decoder 13 is outputted to the monitor display apparatus 3 as it is. The digital TV broadcast signal receiver 1, however, can superimpose various display images on an image which is to be displayed on the monitor screen apparatus 3 through the on screen display unit 15 corresponding to various functions of the digital TV broadcast. In addition, the process for superimposing the images through the on screen display unit 15 becomes simple when it is performed by digital processing. Thus, the NTSC decoder 13 has the A/D converting function and the JPEG compression function so as to perform the digital processing to the analogue TV broadcast signal. The NTSC decoder 13, however, is not necessarily limited to this embodiment.

Subsequently, a control operation for signal receiving direction of the multi-directional antenna 2 through the controller 16 of the digital TV broadcast signal receiver is described with reference to the above-mentioned FIG. 3 and a flowchart shown in FIG. 5.

When the controller 16 senses that the multi-directional antenna 2 is connected to the tuner 11, the controller 16 performs an initial processing for confirming a number of signal receiving directions of the multi-directional antenna 2. The controller 16 sets a numeric value n=16 in a counter (S1), and outputs a control signal for selecting the n-th direction to the control unit 21 of the multi-directional antenna 2 (S2). After outputting the control signal to the control unit 21 of the multi-directional antenna 2, and passing a term necessary for switching the effective signal receiving direction of the multi-directional antenna 2, the TV broadcast signal of a optional channel is received through the tuner 11 (S3). When the TV broadcast signal is received, the controller 16 measures an sensitivity of received TV broadcast signal, and memorizes a measurement data of sensitivity into the memory 17 (S4). Subsequently, the controller 16 subtracts a value one from the numeric value of the counter (S5), and judges whether the measurement of the sensitivity of the TV broadcast signal in each channel of sixteen signal receiving directions has been completed or not (S6). When the measurement of the sensitivity of the TV broadcast signal in each of sixteen signal receiving directions has not been completed, the controller 16 returns to the step S2, and measures the sensitivity of the TV broadcast signal in next signal receiving direction ((n−1)-th direction).

When the measurement of the sensitivity of the TV broadcast signal in each of the sixteen signal receiving directions has been completed (YES in S6), the controller 16 reads out the measured data of sensitivities memorized in the memory 17. When the received TV broadcast signals are analogous, the controller 16 compares data of sensitivities in all signal receiving directions with each other (S7). Subsequently, the controller 16 selects a plurality of, for example, four signal receiving directions "F", "G", "H" and "I" in which values of sensitivities of TV broadcast signals are equal to or larger than a predetermined threshold value, for example, 80 in FIG. 4, in descending order (S8). Subsequently, a still image data in each selected signal receiving direction is taken trough the tuner 11 (S9). The NTSC decoder 13 performs A/D converting process and JPEG compression process to the taken still image data and outputs the processed data to the controller 16 (S10). The controller compares bit rates of the JPEG compressed data of the still image data with each other (S11), decides a signal receiving direction, in which a value of the bit rate is the smallest, as an optimum signal receiving direction of an optional channel, and memorizes a data corresponding to the signal receiving direction into the memory 17 (S12). The controller repeats the above-mentioned steps to each cannel receivable through the connected multi-directional antenna 2.

By the way, the same processes shown in FIG. 5 are performed in an automatic scanning operation of the digital TV broadcast signal receiver 1. When a direction showing the smallest value of the bit rate of the JPEG compressed image data is decided, the controller 16 outputs a control signal for switching the effective signal receiving direction of the multi-directional antenna 2 to the direction of the smallest value of the bit rate to the control unit 21 of the multi-directional antenna 2. After passing the term necessary for switching the effective signal receiving direction of the multi-directional antenna 2, the tuner 11 starts to receive a TV broadcast signal of an optional channel.

Subsequently, a reason why the analogue still image data is processed the A/D conversion once and JPEG compression for deciding the optimum signal receiving direction of an optional channel is described.

In case of a clear image which is not affected by ghost, or the like, luminance data and color saturation data of adjoining two pixels are substantially the same, except outline of the image, in general. In other words, variations of the luminance data and the color saturation data in the clear image are smaller, and complexities of them are smaller. In contrast, in an image in which ghost occurs, the same images repeatedly appear at a predetermined distance, so that a number of outlines becomes larger. In addition, the same images are superimposed, so that the color saturation is reduced. When the signal receiving condition of the TV broadcast signal is lower, it is affected by noise, so that many black and white lines appear on the screen, like sandstorm. In the image affected by the ghost or noise, the variations of the luminance data and the color saturation are larger, and the complexities of them are higher. Accordingly, it is possible to distinguish the clear image with no affect of ghost or the like from low distinction image affected by ghost or noise by comparing the JPEG compressed data of the images.

The multi-directional antenna 2 cannot receive the TV broadcast signals more than two simultaneously, and needs a predetermined term for switching the effective signal receiving direction thereof. Thus, the still image data used for performing the decision of the optimum signal receiving direction of the optional channel are not essentially the same, since the timing of taking the still image data in each signal receiving direction had a time-lag. However, even though the taken still image data are different, it is possible to consider that the variation of the bit rate of the JPEG compressed clear still image data is larger than the variation of the JPEG compressed still image data affected by the ghost or noise. Therefore, it is no problem that one still image data is extracted from a TV broadcast signal which is essentially a moving picture. In addition, when the optimum signal receiving direction of the optional channel cannot be decided due to the still images are largely varied, such as change of a program, while the still image data has been taken it is possible to retry the above-mentioned processing at a predetermined interval.

The signal processing for deciding the optimum signal receiving direction of an optional channel, however, is not limited to the above-mentioned JPEG compression, and comparison of the bit rates of the JPEG compressed still image data. When a multi-directional antenna is connected to the tuner and a television broadcast signal of an optional channel is analogous, it is sufficient that the tuner receives a television broadcast signal of the optional channel in each signal receiving direction of the multi-directional antenna; and the controller takes an image data from each television broadcast signal in each signal receiving direction, performs a predetermined process to each image data, and decides a signal receiving direction showing a lowest complexity of the image data as an optimum signal receiving direction of the optional channel.

In addition, for switching the effective signal receiving direction of the multi-directional antenna 2 to an optimum signal receiving direction of a channel chosen by a user, the digital TV broadcast signal receiver 1 does not necessarily perform an automatic scanning operation. The optimum signal receiving direction of each channel is previously sensed and memorized in the memory 17, and the effective signal receiving direction of the multi-directional antenna is switched to the optimum signal receiving direction of the channel to be switched corresponding to the data memorized in the memory 17. Specifically, the sensitivity of the TV broadcast signal of each receivable channel is measured in each signal receiving direction of the multi-directional antenna 2 confirmed in the above-mentioned initial processing of the digital TV broadcast signal receiver 1, and a direction showing the largest value of the sensitivity of the TV broadcast signal of each channel is memorized in the memory 17 as the optimum signal receiving direction of each channel. When a user chooses a channel, the optimum signal receiving direction of the channel chosen by the user is read out from the memory 17, and a control signal for selecting the optimum signal receiving direction read out from the memory 17 is outputted to the control unit 21 of the multi-directional antenna 2. Since the signal receiving condition of each channel is not varied in the short term, the user can view an image of predetermined quality without performing the automatic scanning operation.

This application is based on Japanese patent application 2004-132342 filed Apr. 28, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method of selecting a signal receiving direction of a multi-directional antenna, the method comprising the acts of:
   receiving an analog television broadcast signal in each signal receiving direction of the multi-directional antenna; and
   taking image data from each television broadcast signal in each signal receiving direction,
   performing a predetermined process to each image data; and
   selecting a signal receiving direction showing a lowest complexity of the image data as an optimum signal receiving direction of the optional channel,
   wherein the predetermined process includes
   taking still image data from the television broadcast signal;
   performing an A/D conversion and JPEG compression to the still image data; and
   comparing a bit rate of JPEG compressed data, wherein the signal receiving direction is selected based on a value of the bit rate that is smallest.

2. The method of claim 1, further comprising:
   receiving a digital television broadcast signal in each signal receiving direction of the multi-directional antenna; and
   taking image data from each television broadcast signal in each signal receiving direction,
   performs a predetermined process to each image data; and
   selecting a signal receiving direction using data obtained from a predetermined error correction process.

3. A digital television broadcast signal receiver connected to a multi-directional antenna having a plurality of signal receiving directions in compliance with a predetermined technical standard, receiving a digital television broadcast signal or an analogue television broadcast signal by making only one signal receiving direction among a plurality of the signal receiving directions effective, comprising:
   a tuner for receiving a television broadcast signal through the multi-directional antenna; and a controller for switching an effective signal receiving direction of the multi-directional antenna; wherein
   when a multi-direction antenna is connected to the tuner and a television broadcast signal of an optional channel is an analog broadcast signal,
   the tuner receives a television broadcast signal of the optional channel in each signal receiving direction of the multi-directional antenna; and the controller takes an image data from each television broadcast signal in each signal receiving direction, performs a predetermined process to each image data, and decides a signal receiving direction showing a lowest complexity of the image data as an optimum signal receiving direction of the optional channel wherein the controller takes a still image data from the television broadcast signal which is essentially a moving picture, and performs an A/D conversion and JPEG compression to the still image data, compares bit rate of JPEG compressed data, and decides a signal receiving direction, in which a value of the bit rate is smallest, as the optimum signal receiving direction of the optional channel.

4. The digital television broadcast signal receiver in accordance with claim 3, wherein the controller can perform an automatic scanning operation for switching the effective signal receiving direction of the multi-directional antenna to a signal receiving direction, in which the complexity of the image data of the processed television broadcast signal is the lowest.

5. A digital television broadcast signal receiver, to which a multi-directional antenna having a plurality of signal receiving directions in compliance with a predetermined technical standard, receiving a digital television broadcast signal or an analogue television broadcast signal by making only one signal receiving direction among a plurality of the signal receiving directions effective, comprising:

a control signal output means for outputting a control signal for directing a signal receiving direction to the multi-directional antenna so as to receive a television broadcast signal;

a television broadcast signal receiving means connected to the multi-directional antenna for receiving a digital television broadcast signal;

a digital signal processing means for performing a predetermined signal processing to the digital television broadcast signal received by the television broadcast signal receiving means;

an analogue signal processing means for performing a predetermined signal processing to the analogue television broadcast signal received by the television broadcast signal receiving means;

a signal output means for outputting a signal processed by the digital signal processing means or the analogue signal processing means to a monitor display apparatus;

a memory means for temporarily memorizing the signal processed by the digital signal processing means or the analogue signal processing means;

a signal receiving direction deciding means for deciding an optimum signal receiving direction with respect to each receivable channel using the data memorized in the memory means; and an entire control means for controlling each component of the digital television broadcast signal receiver, and wherein when a multi-directional antenna is connected to the digital television broadcast signal receiver, the control signal output means outputs control signals at a predetermined interval so as to serially switch the effective signal receiving direction of the multi-directional antenna to one of a plurality of the signal receiving directions defined in the predetermined technical standard;

the television broadcast signal receiving means receives a digital or analogue television broadcast signal in each signal receiving direction at the predetermined interval;

when the television broadcast signal received by the television broadcast signal receiving means is a digital broadcast signal, the signal receiving direction deciding means decides an optimum signal receiving direction of the optional channel using data obtained from a predetermined error correction process; and when the television broadcast signal received by the television broadcast signal receiving means is an analog broadcast signal, the signal receiving direction deciding means measures sensitivity of the television broadcast signal in each signal receiving direction of the multi-directional antenna using the data memorized in the memory, selects a plurality of signal receiving directions in which values of sensitivities of the television broadcast signals are larger in descending order, takes an image data from the television broadcast signal in each of the selected signal receiving directions, performs an A/D conversion processing and JPEG compression processing to the taken image data, and decides a signal receiving direction, in which a bit rate of the processed image data is the smallest, as an optimum signal receiving direction of the optional channel.

6. The digital television broadcast signal receiver in accordance with claim 5, further comprising:

an automatic scanning mode automatically switching the effective signal receiving direction of the multi-directional antenna to a signal receiving direction, in which a signal receiving condition of the television broadcast signal is a highest; and wherein when a user selects the automatic scanning mode, and the television broadcast signal received by the television broadcast signal receiving means is an analog broadcast signal, a television broadcast signal of a channel chosen by a user in each signal receiving direction is received at the predetermined interval;

an image data is taken from a television broadcast signal in each signal receiving direction;

an A/D conversion processing and a JPEG compression processing are preformed to the taken image data;

a signal receiving direction, in which a bit rate of the processed image data is the smallest, is judged as an optimum signal receiving direction of the channel; and the effective signal receiving direction of the multi-directional antenna is switched to the optimum signal receiving direction of the channel so as to receive a television broadcast signal of the channel.

* * * * *